…

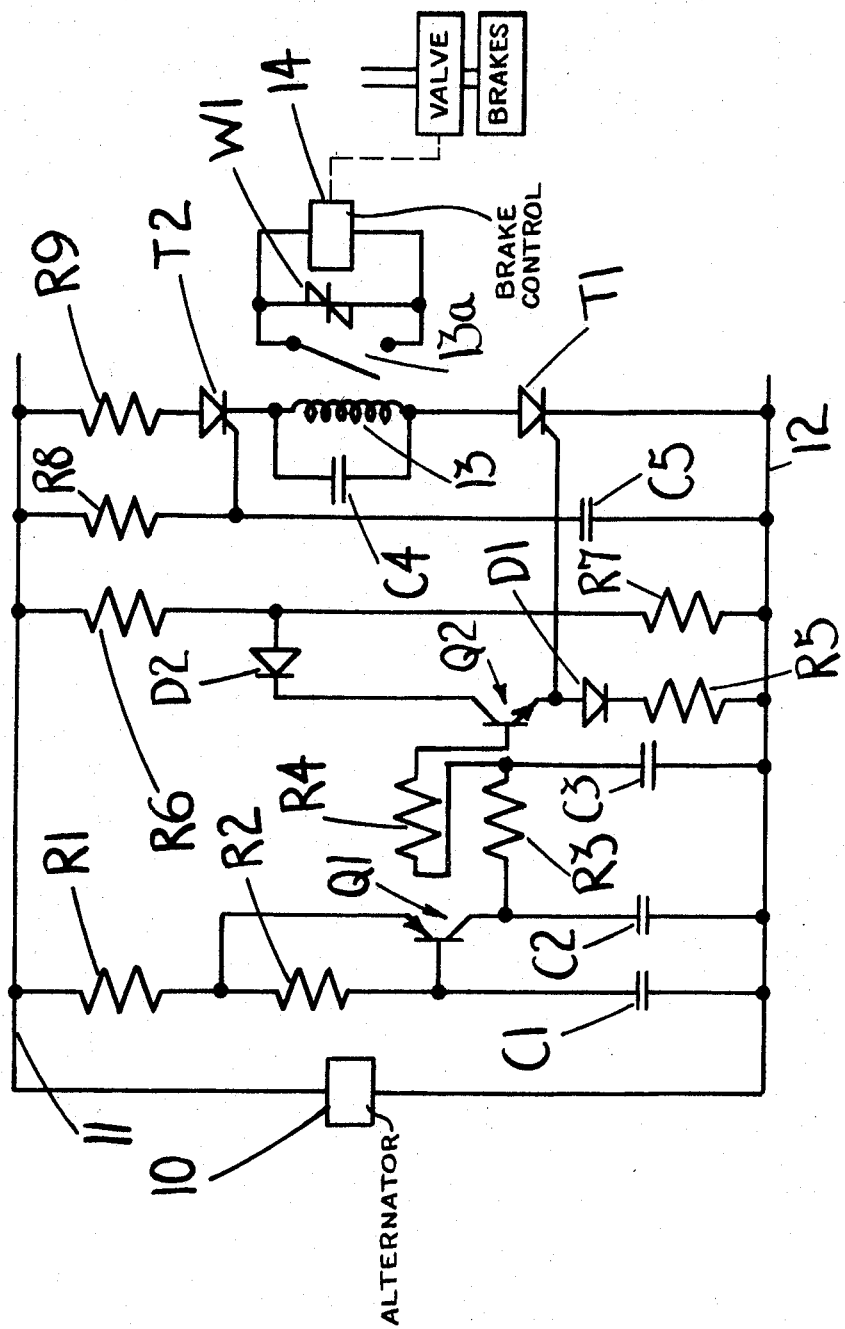

United States Patent Office 3,664,712
Patented May 23, 1972

---

3,664,712
BRAKING SYSTEMS FOR VEHICLES
Leonard R. Hiscox, Birmingham, England, assignor to Girling Limited, Birmingham, England
Filed July 14, 1969, Ser. No. 841,251
Claims priority, application Great Britain, July 29, 1968, 36,031/68
Int. Cl. B60t 8/08
U.S. Cl. 303—21 CF
8 Claims

ABSTRACT OF THE DISCLOSURE

A braking system for vehicles, particularly rail vehicles, includes apparatus for applying braking force to a wheel. The speed of a wheel is sensed by a speed sensitive device, and the speed sensitive device operates a control device which reduces the braking pressure applied to the wheel until the speed of the wheel falls to a predetermined value, at which point full braking force is applied.

---

This invention relates to braking systems for vehicles, particularly rail vehicles.

A braking system according to the invention includes means for applying braking force to a wheel, speed-sensitive means for sensing the speed of the wheel, and control means operable by the speed-sensitive means for reducing the braking pressure applied to the wheel until the speed of the wheel falls to a predetermined value.

The accompanying drawing is a circuit diagram illustrating one example of the invention.

The drawing illustrates the application of the invention to the control of the braking of a rail vehicle. The wheel to be controlled drives an alternator 10 driven from the wheel axle, and the alternator produces an alternating current signal between a pair of supply lines 11, 12. Connected in series between the lines 11, 12 are resistors R1 and R2 and a capacitor C1, the junction of the resistors R1, R2 being connected to the emitter of a p-n-p transistor Q1, the base of which is connected to the junction of the resistor R2 and capacitor C1. The collector of the transistor Q1 is connected to the line 12 through a capacitor C2, and is further connected to the line 12 through a resistor R3 and a capacitor C3 in series, the junction of the resistor R3 and capacitor C3 being connected to the base of an n-p-n transistor Q2 through a resistor R4. The transistor Q2 has its emitter connected to the line 12 through a diode D1 and resistor R5 in series, and its collector connected through a diode D2 to the junction of a pair of resistors R6 and F7 connected in series between the lines 11, 12. The emitter of the transistor Q2 is further connected to the gate of a thyristor T1, the cathode of which is connected to the line 12, and the anode of which is connected through a relay coil to the cathode of a further thyristor T2, the anode of which is connected to the line 11 through a resistor R9. The gate of the thyristor T2 is connected to the junction of a resistor R8 and capacitor C5 connected in series between the lines 11, 12, and the coil 13 is bridged by a capacitor C4. The relay is conveniently a Reed relay having normally open contacts 13a which are protected by a metrosil W1. When the contacts of the relay are closed, they serve to energise a brake control 14 comprising a solenoid driven by a D.C. supply, the solenoid controlling a valve which when the relay contacts 13a are closed reduces the braking pressure which can be applied to the wheel.

The transistor Q1 receives its base signal from the junction of the resistor R2 and capacitor C1, and so the base signal will be phase-shifted with respect to the signal between the lines 11, 12 by an amount dependent on the frequency of the alternator, which is of course dependent on the speed of the wheel. This base signal, therefore, is indicative of actual wheel speed irrespective of instantaneous acceleration and deceleration. Depending on the frequency, the transistor Q1 will conduct either during the positive half cycles of the supply between the lines 11, 12 or during the negative half cycles, and the arrangement is such that as the speed of the wheel increases from zero, the capacitor C2 will acquire a negative charge during each cycle, this negative charge increasing with wheel speed until a predetermined value is reached, and then starting to decrease again. As wheel speed increases further, the negative charge continues to decrease, until at some predetermined wheel speed determined by the parameters of the circuit, the charge acquired by the capacitor C2 becomes positive, and then continues to become increasingly positive as wheel speed increases further. It will be apparent that by suitable choice of the circuit parameters, it can be arranged that at a desired predetermined speed the charge on the capacitor C2 becomes positive. When the charge on the capacitor C2 is positive, the transistor Q2 is turned on, the resistor R3 and capacitor C3 acting as a delay network so that transient variation in the speed of the wheel, as for example, if the wheel should skid, do not affect the circuit. When the transistor Q2 conducts, it provides gate current to the thyristor T1, which, assuming for the moment that the hyristor T2 is conductive, energises the relay to reduce the braking effort which is available. Thus, if the brakes of the vehicle are applied, then if, as will usually happen, the speed of the wheel is above the predetermined value, the charge on the capacitor C2 will be positive, and the transistor Q2 will turn on, so that the thyristor T1 conducts and the relay is energised so that only the reduced braking effort is available. As the wheel speed falls, a point is reached at which the charge on the capacitor C2 ceases to be positive, so that the transistor Q2 no longer conducts, no gate current is supplied to the thyristor T1, and the relay is de-energised, so that the full braking effort is applied. The transistor Q1 operates in the switching mode. The resistor R4 reduces the discharge rate of the capacitor C3 during the negative half cycles, and the diode D1 compensates for changes in the gating characteristics of the thyristor T1 with temperature. The charge which is stored in the capacitors C2 and C3 ensures that if the relay is energised and the wheel slips, the relay will remain energised for about two seconds, by which time the wheel will probably have ceased to slip, bearing in mind that the unit shown is intended to be used in conjunction with a separate unit for preventing or minimising wheel slip.

When the thyristor T1 is turned on to energise the relay, the current must of course flow through the thyristor T2, the bias for which is taken from the junction of a resistor R8 and capacitor C5. The purpose of this arrangement is to control the mean current which flows through the relay. As the wheel speed increases, the mean current would, in the absence of the thyristor T2, increase, with possible damage to the relay. However, by virtue of phase shift produced by the resistor R8 and capacitor C5, the point in each positive half cycle at which the thyristor T2 becomes conductive is delayed with increasing voltage between the lines 11, 12, so that the mean current flow in the relay remains within acceptable limits as the speed of the wheel increases.

In different terms, and to aid in understanding the novel inventive concepts herein expressed, the general circuit as above described can broadly be defined as a control means which is responsive to the actual wheel speed irrespective of instantaneous acceleration and deceleration to reduce the braking force available for application to a wheel only for the interval from application of braking force until the wheel speed falls to some predetermined value.

The primary use of the system described is to enable the braking effort of a high speed train to be increased when the speed falls below a set value, typically 100 m.p.h., so enabling best use to be made of the adhesion, which increases with decreasing speed. The arrangement is particularly useful where an anti-skid unit is employed, because the low adhesion at high speeds can cause excessive operation of the anti-skid unit. The system can also be used with advantage in trains having some stock with disc brakes and some with block brakes. A difficulty with such mixed stock is that the torque of the disc brakes is substantially constant, whereas the torque of the block brakes increases substantially at low speeds. The system described can be used to minimise this disadvantage by arranging that, in the case of the disc brakes only, the braking effort is increased below a set speed, typically 30 m.p.h.

The transistor Q1 could be replaced by an n-p-n transistor, or a field affect transistor having its gate, source and drain connected in the same way as the base, emitter and collector at the transistor Q1. It is to be understood that references in the claims to the base, emitter and collector of a transistor include the equivalent electrodes, namely gate, source and drain, of a field effect transistor.

Having thus described my invention what I claim as new and desire to secure by Letters Patent:

1. A braking system for wheeled vehicles, including brake means for applying braking force to a wheel, speed-sensitive means for sensing the actual speed of the wheel, and control means operable by the speed-sensitive means when the wheel speed is above a predetermined value, said control means being responsive to the actual wheel speed irrespective of instantaneous acceleration and deceleration, said control means reducing the braking force applied to the wheel by said brake means only for an interval from application of braking force until the speed of the wheel falls to said predetermined value.

2. A system as claimed in claim 1 in which the speed-sensitive means comprises a generator driven by the wheel and producing an alternating signal of frequency dependent on the speed of the wheel, and a frequency sensitive circuit to which the generator output is applied, the frequency sensitive circuit producing an output the polarity of which changes at the predetermined wheel speed to operate the control means.

3. A system as claimed in claim 2 including a delay network between the frequency sensitive circuit and the control means to prevent operation of the control means by transient variations in wheel speed.

4. A system as claimed in claim 2 in which the control means is powered solely by the generator output.

5. A system as claimed in claim 4 in which the control means comprises a relay having its coil connected in series with a thyristor the gate current of the thyristor being controlled by the frequency sensitive circuit.

6. A system as claimed in claim 5 including a second thyristor connected in series with the relay coil and first thyristor, and means for providing the second thyristor with gate current at a time in each positive half cycle of the generator output which varies with frequency, so that when the first thyristor is provided with gate current, the mean current flow in the relay coil will be controlled.

7. A system as claimed in claim 2 in which the frequency sensitive circuit comprises in combination first and second input terminals for connection to an A.C. supply of varying frequency, first and second output terminals, the second input and second output terminals being interconnected, a phase shifting network connected between the first and second input terminals, and a transistor having its base connected to the phase shifting network, its emitter connected to one of the input terminals and its collector connected to the other input terminal through an impedance, the first output terminal being connected in the circuit in a position such that the output at the output terminals changes polarity at a predetermined frequency.

8. A sysem as claimed in claim 7 in which the phase shifting network comprises a resistance chain and a first capacitor connected in series between the first and second input terminals, the base of the transistor being connected to the junction at the chain and first capacitor, the emitter of the transistor being connected to the first input terminal through part of the resistance chain, and the collector of the transistor, to which the first output terminal is connected, being connected to the second input terminal through a second capacitor.

References Cited

UNITED STATES PATENTS

| | | | |
|---|---|---|---|
| 2,140,625 | 12/1938 | Miller | 303—21 CF |
| 2,711,230 | 6/1955 | Wilson | 303—21 CE UX |
| 2,980,369 | 4/1961 | Ruof | 303—21 CE |
| 3,235,036 | 2/1966 | Meyer et al. | 188—181 C |
| 3,245,213 | 4/1966 | Thompson et al. | 303—21 BB |
| 3,233,153 | 2/1966 | Ryan | 180—82 X |
| 3,494,671 | 2/1970 | Slavin et al. | 303—21 P |

FOREIGN PATENTS

| | | | |
|---|---|---|---|
| 1,181,264 | 1/1952 | Germany | 303—21 CE |

MILTON BUCHLER, Primary Examiner

S. G. KUNIN, Assistant Examiner

U.S. Cl. X.R.

18—105 E; 192—3 H; 303—20; 317—5